(12) United States Patent
Aharonson (10) Patent No.: US 8,300,287 B2
(45) Date of Patent: Oct. 30, 2012

(54) SYSTEM, METHOD AND DEVICE FOR MULTI-PAGE FEED FOR KEYBOARD SCANNER

(76) Inventor: Dov Aharonson, Herzelia (IL)

( * ) Notice: Subject to any disclaimer, the term of this patent is extended or adjusted under 35 U.S.C. 154(b) by 324 days.

(21) Appl. No.: 12/620,113

(22) Filed: Nov. 17, 2009

(65) Prior Publication Data

US 2011/0116142 A1 May 19, 2011

(51) Int. Cl.
*H04N 1/04* (2006.01)
(52) U.S. Cl. ......... 358/496; 358/498; 358/486; 358/474
(58) Field of Classification Search .................. 358/496, 358/498, 486, 474, 504
See application file for complete search history.

(56) References Cited

U.S. PATENT DOCUMENTS

| 5,499,108 | A | 3/1996 | Cotte et al. |
| 5,623,285 | A | 4/1997 | Aharonson et al. |
| 5,822,080 | A | 10/1998 | Chavez |
| 7,212,295 | B2 | 5/2007 | Falk et al |
| 7,484,723 | B2 | 2/2009 | Kuo et al. |
| 2004/0085574 | A1 | 5/2004 | Falk et al. |
| 2008/0225343 | A1* | 9/2008 | Yoneda et al. ............... 358/296 |
| 2009/0310194 | A1* | 12/2009 | Shimizu et al. ............... 358/498 |
| 2010/0072696 | A1* | 3/2010 | Cheng .......................... 271/264 |

OTHER PUBLICATIONS

Fujitsu. "iScanner fi-6010N." 2008. [retrieved on Feb. 25, 2011]. Retrieved form the Internet URL:<http://www.fujitsu.com/downloads/IMAGE/catalog/fi-6010n.pdf>.
International Search Report, mailed Mar. 16, 2011for PCT International Application PCT/IL2010/000957.

* cited by examiner

*Primary Examiner* — Houshang Safaipour
(74) *Attorney, Agent, or Firm* — Pearl Cohen Zedek Latzer, LLP (57) ABSTRACT

A device, system and method for incorporating a multipage feeder into a keyboard scanner to allow continuous and sequential feeding of more than one page into a scanner housed in a computer keyboard. A multipage feeder may be for example integrated into or attachable to and detachable from a single page feeder also included in the keyboard housing.

15 Claims, 10 Drawing Sheets

SYSTEM, METHOD AND DEVICE FOR MULTI-PAGE FEED FOR KEYBOARD SCANNER

FIELD OF THE INVENTION

The present invention generally relates to computer keyboards. More particularly, the present invention relates to a system, method and device for integration of a multipage feeder into an integrated keyboard and document scanner.

BACKGROUND OF THE INVENTION

A housing that includes a computer keyboard with a document scanner and that approximates the footprint and dimensions of a typical keyboard is known. The size and volume limitations on such devices have prevented expansion of their functionality to single page feeding and scanning.

SUMMARY OF THE INVENTION

An embodiment of the invention may include a device having a housing, where the housing has a computer keyboard, a document scanner, and a multipage feeder to consecutively feed to the scanner one or more pages. The housing may also include a single page feeder. Each of the single page feeder and the multipage feeder may include a separate channel for directing pages to the scanner.

In some embodiment the housing may include a communication hub such as a USB hub. A keyboard and a scanner may be connected to the hub in the housing while the housing may include a single cable to a computer. The hub in the housing may support additional ports to connect an automatic-document-feeder or to supply such device with power.

In some embodiments, one or more sensors may detect a presence of a second page that is put into position in the housing, and that may issue a signal to feed the second page into the scanner once there has been progress of the scanning of the first page.

In some embodiments the housing may include a page separator to feed a first page to the document scanner, and then to feed a second page to the document scanner at a predefined interval after feeding the page.

In some embodiments a footprint of the housing may approximate a footprint of a computer keyboard.

In some embodiments the multipage feeder is detachably connected to the housing, or connected so that it can be opened by way of for example hinges or another locking mechanism.

In some embodiments there may be included in the housing an extendable arm or tray to support a portion of pages that are distal to the scanner.

Some embodiments may include an off-center roller having a first diameter at a first point on a circumference of the roller, and a second diameter at a second point on the circumference of the roller, such diameter changes can be for example continuous or changed in steps.

Some embodiments may include a page separator having a roller with a first radius at a first point on its circumference, and a second radius at a second point on its circumference, where the page separator has a traction member with a plane facing the circumference of the roller, where such plane is positioned at a distance from the roller to contact the circumference of the roller at the first point and to not contact the circumference of the roller at the second point; and where, upon an engagement of a page between the first point and the traction member, the first page is propelled along the circumference of the roller, and upon an engagement of a second page at the second point on the roller, the second page is not propelled along the circumference of the roller.

In some embodiments, the roller may also have the first radius at a third point on the circumference of the roller, and a circumferential distance between the first contact of the first point with the traction member and a last point of contact of the third point with the traction member approximates a distance between the last point of contact and an entry point of the first page to the next feeding or scanning stage which can be for example between a second roller and a third roller or between a second roller and scanner sensor. In some embodiment the described multipage feeding mechanism may be used on other types of page feeding devices such as multiple page feeding for printers, fax machines, shredding machines, binding or sorting machines. In some embodiments the separation roller may be a regular roller with a single radius.

Embodiments of the invention may include a method of scanning pages including inserting pages into a housing of a keyboard, where the housing includes a scanner, and issuing a signal from a key of the keyboard or a dedicated key on the housing to scan the pages, or multiple such keys each indicating scanning for a specific output function. In some embodiments, the signal may be a signal to feed a first page, and after a pre-defined interval, a second signal may be issued to feed a second page. In some embodiments, the detection of a document on the feeding tray of a single page feeder or the multipage feeder may initiate a feeding and scanning of the positioned pages without the need for a user to issue a signal.

In some embodiments the method may include terminating a contact of a page by at least one of the protrusions and the member once the page has entered between a second roller and a third roller.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system or similar electronic computing device, that manipulate and/or transform data represented as physical, such as electronic quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention may be stored as instructions on for example a mass data storage device, such as a memory or disk drive, and may be accessed and executed by a processor that is associated with the storage device.

A computer may be a device that may have computing power and channel connectivity to communicate with and operate a scanner. Such a device may be or include for example a desktop personal computer, a laptop, a network personal computer, a cellular phone, a tablet PC etc. In some cases a computer may include a controller embedded in a keyboard or in another peripheral such as printer or memory device or in both of them, and such controller may enable a direct communication between such two peripheral devices, and may enable scanning directly into the printing device without an intervention of an additional computer device, or may allow scanning and saving the output onto a separate memory device without the need for additional computer device.

As used in this application, the term 'keyboard' may, in addition to its regular meaning, mean a keyboard for a computer that may include keys for the letters in the alphabet, number keys and various function keys as are found on and compatible with a computer keyboard. A keyboard referred to in this document may issue the typical alphabetic, numeric and control function input signals as are compatible with processors found in computers or other processors. The dimensions of a keyboard or a housing for a keyboard may be approximately 18 inches long, 9 inches wide and from 1-4 inches in height, and may approximate the footprint (length and width) and height of standard keyboard as are used with desk top personal computers. Significant deviations of up to 50% from these dimensions are possible as there are keyboards that do not include separate numeric pads or other functions usually found on full size keyboards. For example keyboards for laptop computers or cellular phone devices may have less than or more than the 101 keys generally found on a full size keyboard. Some keyboards may include extended sets of special keys for example for volume control, e-mail, financial, control, computer aided design, simulation or gaming applications etc.

As used in this application, the term 'scanner' may, in addition to its regular meaning, refer to an electronic imaging device suitable for capturing images of a document or a part of a document that is exposed or brought into view of such device.

In some embodiments, the paper feeding and separation mechanism and process as is described in this application may be implemented in any suitable sheet or document movement system such as printers, painters, copiers, fax machines, binders, folders, collators and the like where feeding a single sheet at a time is important for a proper functioning of the feeding process.

In addition to its regular meaning, as used in this application, the term multipage feeder may refer to a paper feeding mechanism that directs a first page into a channel, such as a channel for printing, scanning, facing or other paper processes, and then with or without input from a user, detects the presence of a second page to be directed into the channel and directs such second page into the channel. In some embodiments, the process may continue until all of the pages that have been placed into position have been directed into the channel. Among its features, a multipage feeder may time or initiate the input of a second page into a channel only once the processing of a first page has been completed, or at least until a point where the introduction of the second page into the channel will not interfere with processing of such first page. Further, a multipage feeder may separate a first page in a stack from a second page in a stack so that the two pages are not fed into the channel concurrently, or that a second page is not fed into the channel prematurely. A multipage feeder may also detect that a first page and a second page or other pages are to be included or saved in one file such as a scanned document saved into a .pdf file or in separate multiple file documents.

As used in this application, and in addition to its regular meaning, the term 'automated' may mean without continued input from a user, or even without an initial input from the user, other than for example placing a page in a position for scanning. For example, an automated multipage feed of a document, may mean a response to a user's signal to feed all of the pages that are in position for feeding into a feeder. In some embodiments a sensor may detect the presence of pages that have not been fed or that are waiting to be fed into the scanner, and may consecutively, and at proper intervals, feed into a scanner all of such pages without any signal from the user.

The intervals for such feeding a series of pages may likewise be automated so that a second page is not fed into the relevant channels until the system or device determines that such feeding of the second page will not interfere with the processing of the prior page through the system or device. For example, in some embodiments, a proper interval for a feeding of a second page into a channel may be once a first page has passed over a scanning sensor and is emerging through an ejection slot of the device. At such a time the feeding of a new page can start in parallel to the ejection process. In some embodiments the criteria to start feeding of next page is that there is enough distance from the end of the preceding page to allow a sensor to detect the end of the preceding page and the beginning of the new page. In such a case the automatic feeder may start feeding the new page even before the preceding page finished the scanning process.

As used in this application, and in addition to its regular meaning, the term single page feeder may mean a system for feeding a single page document into a scanner, such that pages are placed on a feeding tray one by one, and such that after a first page is fed and scanned, the system waits for the user to place a second page on the feeding tray and a signal from a user to begin a scan of a second page Alternatively or in addition, a single page feeder may wait for the user to manually place a new page on the feeding tray and once the new page is detected automatically, the system may continue scanning the second page without a further signal from the user.

As used in this application, and in addition to its regular meaning, the term 'page separator' may mean any suitable device or system that may facilitate feeding of one page from a group pages, one at a time, and for avoiding, where possible, the feeding of two pages at a time or of one page and followed by an improper feeding of a second page.

Figure 1:
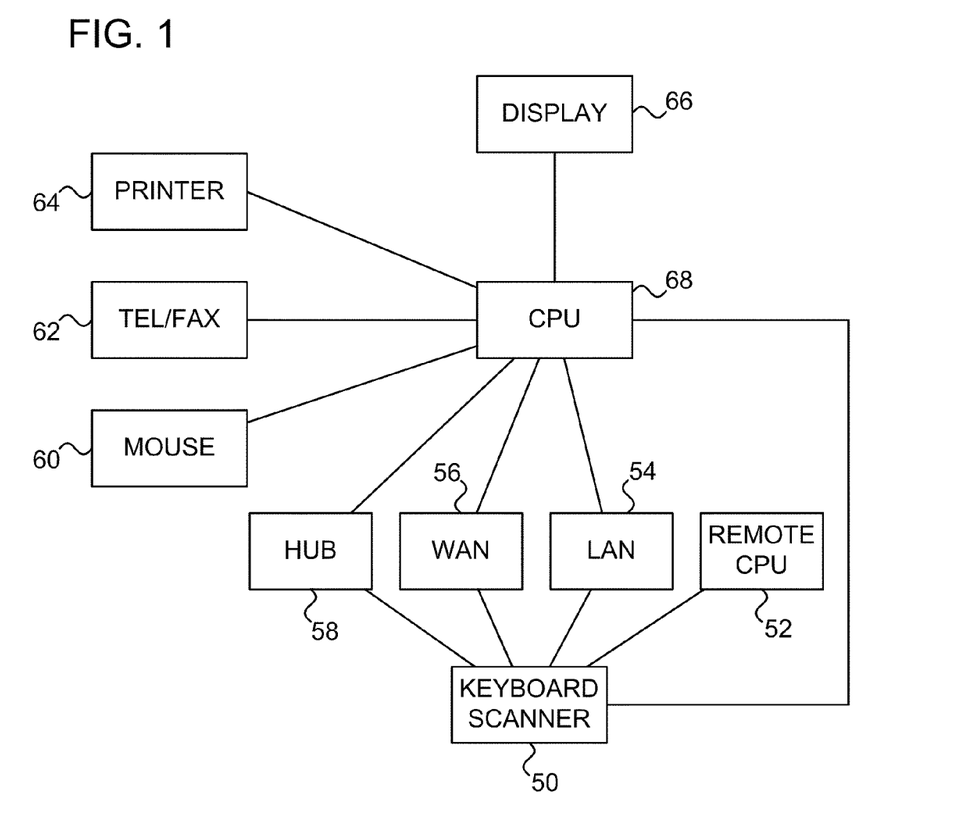
FIG. 1 is a schematic diagram of connectivity possibilities of a keyboard scanner with a computer and other networked components according to an embodiment of the invention.

Reference is made to FIG. 1, a schematic diagram of connectivity possibilities of a keyboard scanner with a computer and other networked computers, in accordance with an embodiment of the invention, is shown. In some embodiments, a keyboard scanner 50 may include communication connectivity with some or all of the components that are connected as part of a network. Such connectivity may allow items that are scanned through a keyboard scanner to be transmitted to other components that are connected to the network, and may allow the keyboard scanner to control or be controlled by one of such components, or may allow a scanned document to be saved on one or more of such components. Similarly, a command that is input into a keyboard scanner may be directed to one or more of the components that are connected to the network. Such components may include for example one or more of a remote central processor (CPU) 52 such as may be included in a personal computer, a local area network (LAN) 54, a wide area network (WAN) 56, a hub 58 such as an Ethernet or USB hub, a mouse 60 or other hand-controlled device or pointing device, a telephone/fax 62, a printer 64, a display 66 or a remote processor 68. In some embodiments, there may be a direct communication and control between a keyboard/scanning device and another peripheral device such as printer or control or data storage devices where the control data and scanning data are passed between the two devices without having the need for a separate computer in between an exchange of scan data between such two peripheral devices.

Figure 2:
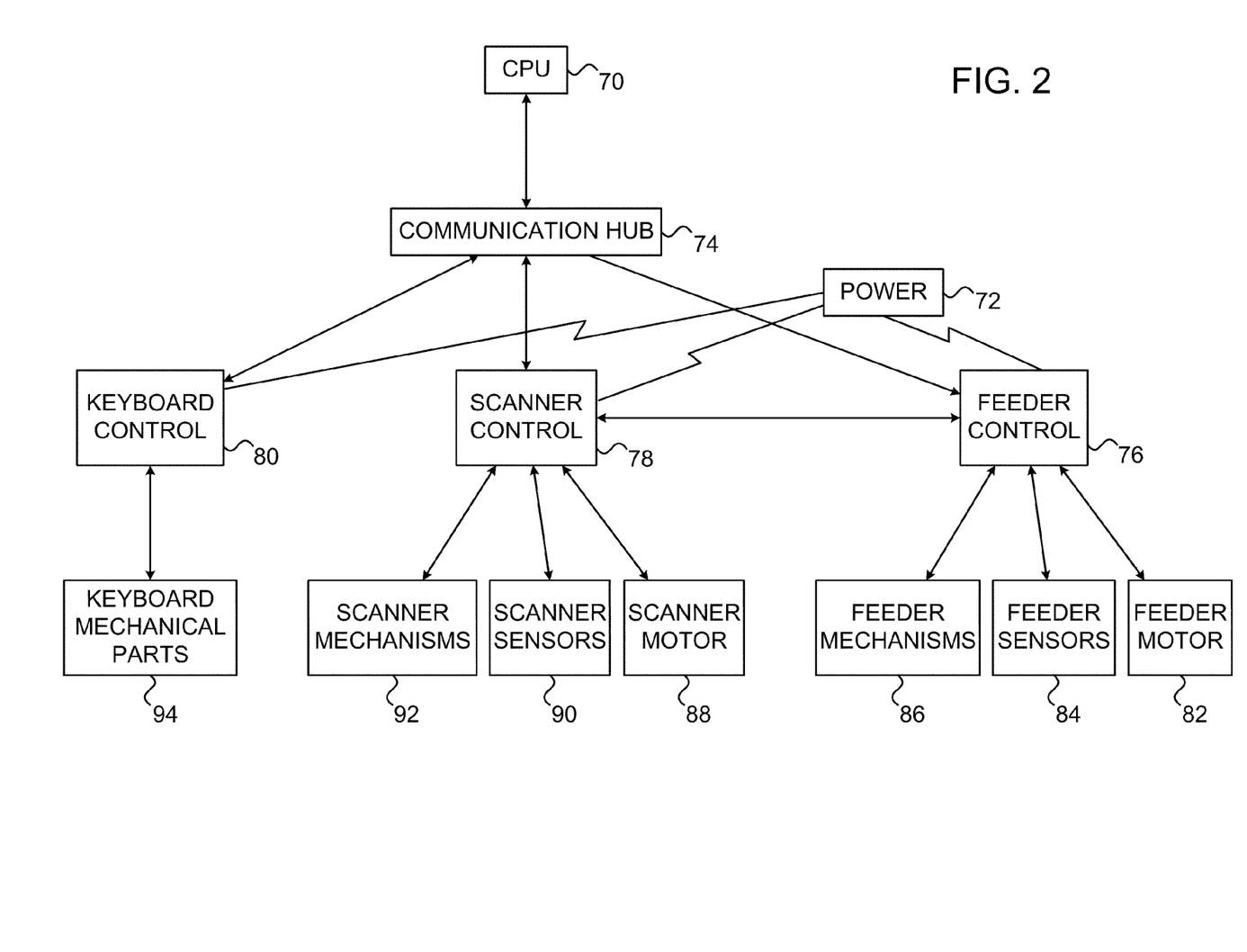
FIG. 2 is a schematic diagram of sensors and components that may control or be controlled by a keyboard scanner according to an embodiment of the invention.

Reference is made to FIG. 2, a schematic diagram of sensors and components that may control or be controlled by a keyboard scanner. In some embodiments, a keyboard scanner may include, connect to or be connected to one or more components and sensors, and one or more of such components or sensors may send signals to or receive signals from one or more of such other components. Such components may include a CPU 70 that may be located within or outside of the housing of a keyboard scanner 50 and a power source 72 that may be located within or outside of the keyboard scanner 50. Power source 72 may supply power to one or more of communications hub 74, page feeder control 76, scanner control 78 and keyboard control 80, as well as to the various mechanisms and scanners that may be attached to such components. Feeder control 76 may be attached to or associated with one or more feeder motors 82, feeder sensors 84 and feeder mechanisms 86. Scanner control 78 may be attached to or associated with one or more scanner motors 88, scanner sensors 90 or scanner mechanisms 92. Keyboard control 80 may be attached to or associated with various key and mechanisms 94. In some embodiments, one or more of such components may be housed with or in, or combined with or divided into one or more other of such or other components such that one device, mechanism or sensor may serve more than one function, and one function may be divided among more than one device, mechanism or sensor. For example, the keyboard, the scanner and the feeder may each have their own controller or part or all of them may be controlled by a same controller.

Figure 3A:
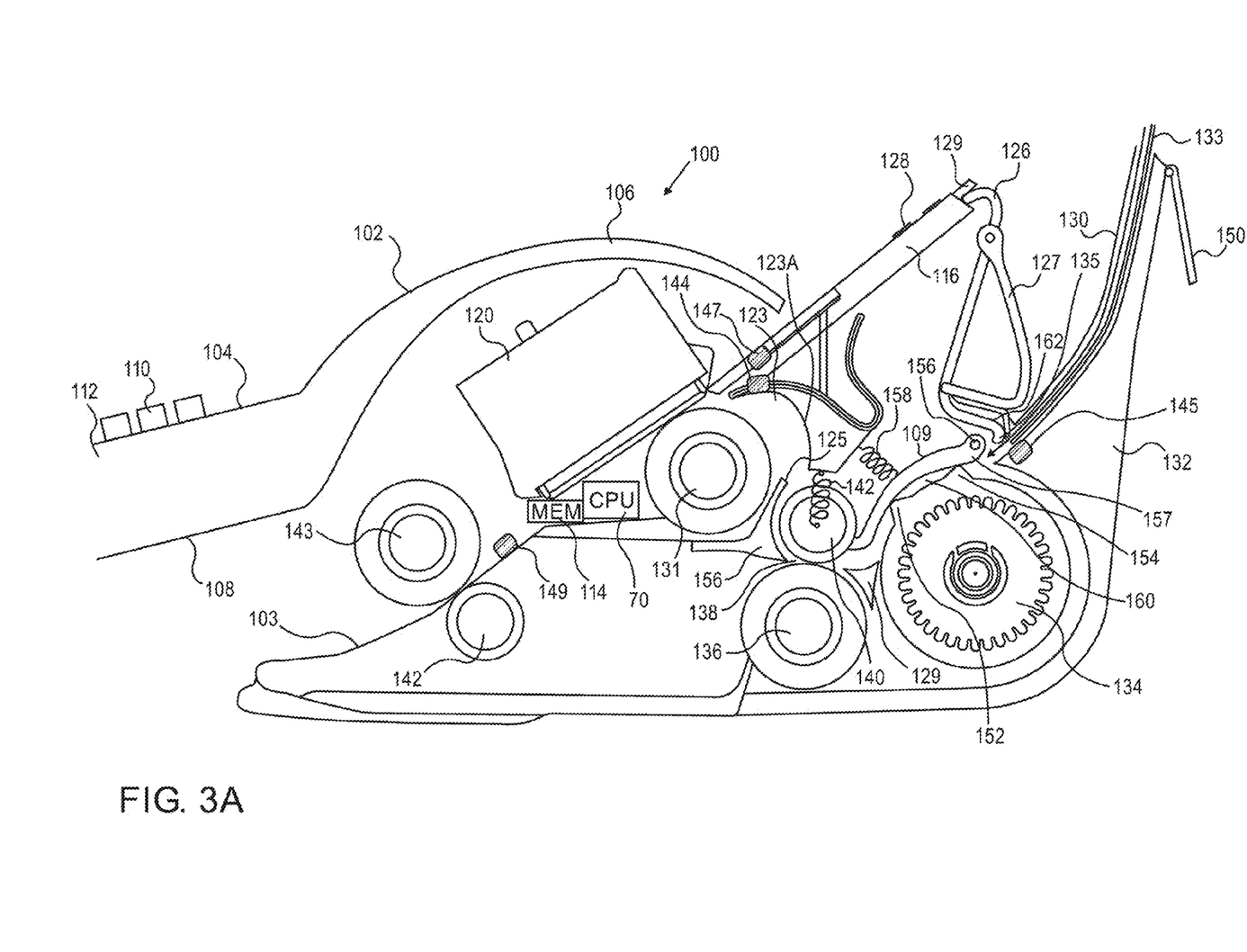
FIG. 3A is a schematic side-view diagram of an integrated keyboard scanner having multipage automated feeding capabilities and single page feeding capabilities configured as bottom-page-first feeder, in accordance with an embodiment of the invention.

Reference is made to FIG. 3A, a schematic side-view diagram of an integrated keyboard scanner device having multipage automated feeding capabilities with bottom-page-first configuration, in accordance with an embodiment of the invention. Device 100 may include a housing 102 that may include top housing keyboard cover 104 and a top housing scanner cover 106. Housing 102 may include, encompass, secure, hold or serve as a base 108 for keys 110 of a keyboard 112. Keys 110 may be used for issuing signals to a computer or processor (CPU) 70. CPU 70 may in some embodiments be one or more dedicated processors for device 100 or may be the processor of a computer system to which device 100 is attached or may be the controller of another peripheral device such as printer or storage device. Processor 70 may have a connection to a memory 114. Device 100 may also include a document scanning optical sensor 120 that may be suitable for capturing images or image data of a document such as those on a sheet of paper. Sensor 120 may be from 8 to 10 inches long as may be typical to scan 8×12 or A4 sized paper, though sensors 120 of other sizes and dimensions are possible. In some embodiments, sensor 120 may be located under or diagonally or orthogonally above the keyboard 112.

Housing 102 may include a document ejection slot 103 by which documents that have been scanned are fed out or away from housing 102. In some embodiments, slot 103 may form a channel under keyboard 112 so that pages that have been scanned are ejected from under the keyboard 112 and away from the housing 102. Such ejection may be from above the keyboard, between the keyboard and the scanner, or from the back of the keyboard such that a scanned document may be ejected from the rear.

In some embodiments, housing 102 may include one, two or more possible page feed processes and tracks or channels. For example, a first process or channel may be directed toward a single page feed, or manual single page processes, through a single-page feed slot or upper tray 128. Upper tray 128 may include a page rest 129 that may guide an inserted page over base 116 inwards towards a scanner feeding roller 131. An advantage of such single page feeding is the simple and fast process for feeding single pages, as well as the ability to feed rigid documents such as plastic cards or a driver's license through the straight feeding path, since such rigid pages may be unsuited for feeding through a curved channel of a multipage feeder.

A second process may be used for automated or multipage feeding and may utilize a multipage bay 130 or lower tray into which several pages 133 may be inserted or positioned proximate to housing 102, for consecutive feeding into channel 135. Bay 130 may include a back rest or door 132 that may be opened by a user, such as for clearing stuck pages or other trouble shooting purposes, and that may be closed and hidden away when bay 130 is not in use. A bottom of bay 130 may form a second slot by which one or more pages 133 may be fed through a channel 135 from bay 130 into contact with multipage separation roller 134. In some embodiments, a feeding roller 136 may be used to guide a page from multipage separation roller 134 through channel 138 to scanner feeding roller 131. A stopper 109, in the form of for example a curved or straight tab may be pressed up to feeding roller 134 to assist in the prevention of simultaneously feeding more than one page into device 100.

Bay 130 may also include a front support 126 and an arm 127 for pushing pages 133 that are held in bay 130. A front part of the bottom of bay 130 (as appears on the left side of bay 130 in FIG. 3A, and as would be closest to the keys 110 on a keyboard 112) may be shaped as a ledge 162, or staging area to hold in an idle position all but a few of the pages 133 that may have dropped into bay 130, while the few pages that are next in line to be scanned are pushed towards the page entry channel 135 by arm 127. Keeping most of the pages 133 away from roller 134 and channel 135 may limit the weight on roller 134 and on a page being fed and help to prevent a feed of two or more pages at one time into channel 135. In some embodiments, arm 127 may be held by for example a spring that gently pushes pages 133 towards door 132 as more and more pages are fed into channel 135. In some embodiments, at the beginning of each feed of a page into channel 135 or at another stage, arm 127 may push the stack of pages 133 away from ledge 162 and towards door 132 so that the right-most few pages 133 compete for entrance into channel 135. The combination of ledge 162 which may hold most of the pages 133 in bay 130, and arm 127 which may nudge a few pages towards channel 135 may allow many pages 133 to be placed into bay 130 while only a few of such pages at a time are brought into proximity with a starting point of a feeding process.

In some embodiments, a left end of ledge 162 may be attached to a bottom of a left side of bay 130 with an axis, about which ledge 162 may pivot or partially rotate clockwise, or be raised slightly at the start of a feed of a page into channel 135, so that a few pages 133 are nudged into channel 135 and ready or standing-by to be fed into channel 135.

In some embodiments both feeding roller 136 and multipage separation roller 134 may be powered by a motor. Idle roller 140 may press against feeder roller 136, and may in some embodiments not be powered, but rather may move upon the rolling of feeder roller 136.

Separation roller 134 may include one, two or more protrusions 152 and 154, in the shape or bumps or ridges or arcs. As is described below in this application, when roller 134 rotates, protrusion 152 may catch a page 133 against a leading edge 157 of stopper 109, so that only the one page 133 caught against stopper 109 is brought into channel 135. Other pages 133 in bay 130 that are not caught by protrusion 152 as it passes by stopper 109 will not be brought into channel 135. In some embodiments, roller 134 may be a radial roller without varying diameters.

Figure 4A:
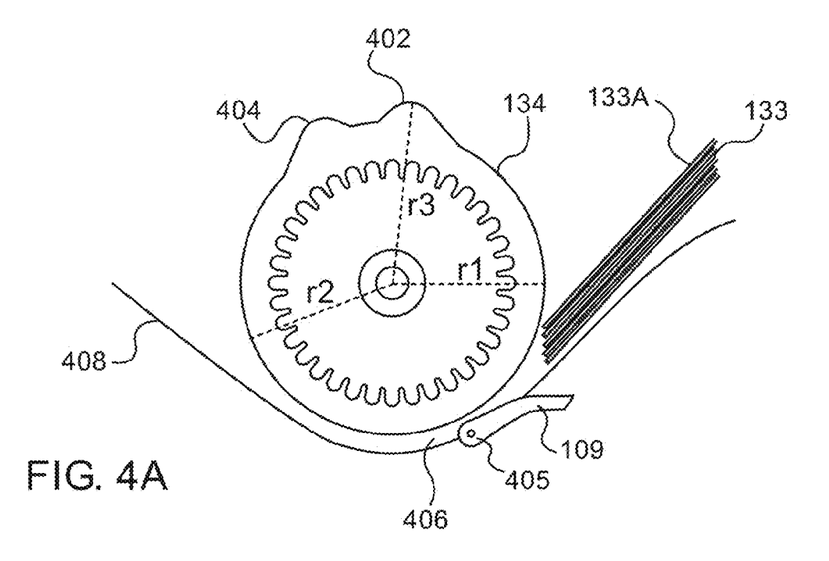
FIG. 4A is a schematic detailed view of a multipage roller with protrusions.
Figure 4B:
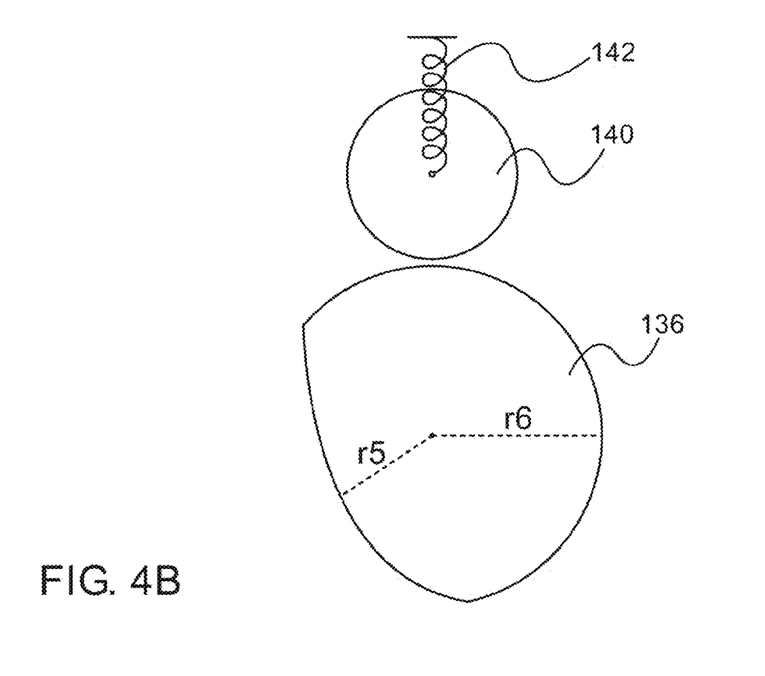
FIG. 4B is a schematic side view of an off-center roller, in accordance with an embodiment of the invention.

Reference is made to FIG. 4A, a schematic detailed view of a multipage roller 134 with protrusions, and to FIG. 4B, a schematic side view of an off-center feeder roller 136 and idle roller 140, in accordance with an embodiment of the invention. In some embodiments, one or both of roller 136 and roller 134 may be ex-center or off-center rollers so that different areas of the circumference of the roller have a different radius. For example, in FIG. 4A, a radius R1 of roller 134 may be or represent a radius of roller 134 that would be the measure of such roller 134 had it been in a properly cylindrical shape, for example 15 mm. Radius R3 may be the radius of the roller from the center to top of protrusions 152 and 154, where R3 is greater than R1, for example 17 mm. Radius R2 may be situated on a narrowest arc of roller 134 and may be smaller than each of radius R3 and R1 for example 13 mm. With these various radii, roller 134 may be configured as a lop-sided or ex-center radius. A distance from the center of roller 134 to the plain of surrounding wall 408, may approximate a length of R3, so that protrusions 152 and 154 remain in contact with wall 408 as they rotate, and thereby keep page 133A moving through channel 406.

When roller 134 starts rolling, protrusions 152 and 154 may press against stopper 109 which may rotate on its axis 405 to provide snug traction between stopper 109 and protrusions 152 and 154, and a page may be propelled by such traction to follow a rotation around roller 134 and channel 406.

In some embodiments, roller 134 may include different diameters at two or more points on its circumference, and varying diameters may be continuous or may create single or multiple steps of varying diameters at a single or multiple locations on such circumference. In some embodiments, a contact between roller 134 and stopper 109 may be limited to the one or more points or arcs along a circumference of roller 134 where the protrusions 152 and 154 are present.

In FIG. 4B, roller 136 may also have different radii R5 and R6, where R6 has a greater length than R5. When the portion of roller 136 having radius R6 is facing idle roller 140 which is pushed forward by spring 142, the two rollers 136 and 140 may touch or be in contact, such that a page 133 that is between them will be pulled along by the rotation of roller 136 and the pressure of its contact with roller 140. However, when the portion of roller 136 having radius R5 is facing idle roller 140, idle roller may still be pushed by spring 142, but it will no longer be in contact with roller 136, thereby letting page 133 flow freely over roller 140. In some embodiments, roller 136 may include a roller having a uniform diameter, and idle roller 140 may be pushed upward by one or more side discs mounted on the same axis as roller 136 in such way that at a certain point the side discs' radius is larger and it may push the axis of roller 140 upward to detach it or interfere with a connection of roller 140 from roller 136. Other ways of separating roller 136 from contact with roller 140 are possible. In some embodiment, the rollers 136 and 140 may maintain contact and may continue pushing page 133, or a mechanism may allow them to roll freely without applying pressure on the paper pulled by the roller 131 during scanning.

Returning to FIG. 3, before starting to feed a page 133, a controller such as CPU 70 or dedicated feeder control 76 (as is shown in FIG. 2), may position roller 134 so that protrusion 152 is proximate to and slightly to the right of leading edge 157 of stopper 109 (for top-page-first feeders, the positioning may be slightly to the left of the such leading edge 157). During the first stage of the counterclockwise rotation of roller 134, protrusions 152 and 154 may press against a lower plain 160 of stopper 109, and may draw, grab or engage a bottom page in bay 130 between protrusion 152 and lower plain 160 of stopper 109, so that such bottom page is propelled into channel 135. The push of protrusions 152 and 154 against stopper 109 may also cause stopper 109 to rotate slightly counterclockwise on its axis 156 so that the front (shown on the right side in the figure) moves in and out or up and down, causing a push on the bottom few pages in bay 130 and a separation or loosening of those pages to further prevent concurrent feeds of two pages. Axis point 156 may be connected to any suitable point on housing 102.

In some embodiments, the circumferential distance between the first contact of protrusion 152 with a lower plain of stopper 109 and a last contact of protrusion 154 with stopper 109 may be the distance required to bring a page 133 in contact with feeding roller 136, plus a few extra millimeters to account for possible slippage of the page 133 in channel 135. Guide 129 may guide page 133 towards a first contact point with feeding roller 136. In some embodiments, a circumferential distance between protrusion 152 and protrusion 154 may approximate a circumferential length of a contact between stopper 109 and protrusion 152, so that when protrusion 152 passes and loses contact with stopper 109, protrusion 154 comes into contact with stopper 109. In some embodiments, roller 136 and idle roller 140 may be absent, and roller 134 may feed page 133 directly into the roller 131 to sensor 120.

In some embodiments, feeding roller 131 may be positioned in front or in advance of sensor 120 rather than opposite or under sensor 120 as appears in FIG. 3A. In such embodiments, roller 131 may include a counter idle, or motorized support roller such that a page 133 is fed between roller 131 and the idle roller, and from there to sensor 120. In such embodiments separation roller 134 may feed a page directly to the roller 131 and the idle roller that opposes it.

Once protrusion 154 rotates past stopper 109, the pulling function of roller 134 may end since there is no longer pulling pressure between roller 134, page 133 and stopper 109, along the area of roller 134 that has the smaller radius such as in the portion of its circumference that is away from protrusions 152 and 154. Such pulling function may, from such point forward, be taken over by feeding roller 136 or roller 131, which may pull page 133. Once protrusion 154 has passed stopper 109, stopper 109 may rotate downward close to, but not in contact with, an outside circumference of roller 134. Contact of stopper 109 with roller 134 may be prevented by spring 158 or by a movement-limiting pin or other suitable restraining device, which may hold stopper 109 above roller 134 in those areas of 134 that do not have protrusions 152 and 154.

The limitation of contact points between roller 134 and stopper 109 to the two points of protrusions 152 and 154 may limit the possibility of concurrent feeding or more than one page 133 at a time, since a second page to be fed would usually lag behind a page 133 currently being fed, and such lagging second page would not be subject to the pulling traction of protrusions 152 and 154. Since there may be no other point of contact or traction between stopper 109 and roller 134, there would be nothing to pull a second fed page into channel 135.

Ex-center feeder roller 136 may catch page 133 in a first part of its rotation, where the part of its circumference having a longer radius is brought into contact with idle roller 140. The traction or close contact between roller 136 and roller 140 in such first part of the rotation of roller 136, may push page 133 past guide 156 and up towards channel 123 where it is bent around to be brought into contact with scanner roller 131 or by some other pulling mechanism. In some embodiments, the portion of roller 136 with the longer radius may push guide 156 forward (to the right in the figure) so that page 133 is guided by point 125 towards the rounded wall of channel 123A and further to channel 123. Such guiding of the page 133 along channel 123 may prevent an edge of page 133 from being caught on a bottom right corner of sensor 120.

When this portion of the feeding is complete, guide 156 may retract back (down and left) so that guide 156 does not generate extra traction when page 133 is pulled by scanner roller 131. The movement of guide 156 may not be necessary if channel 123 is short enough to ensure that page 133 is pushed towards scanner roller 131 and not caught on a corner of sensor 120.

Once page 133 is brought into or caught by scanner roller 131 at entry point 107, the rotation of feeder roller may 136 have progressed so that the part of its circumference having the shorter radius is facing idle roller 140, and so that there is little or no contact between roller 136 and roller 140.

Some embodiments of the invention may include an extendable, telescoping or retractable arm or arms or foldable extendable tray 150 that can be raised to support the upper or distal end (relative to channel 135 and scanner 120) of pages 133 as they are waiting to be fed into channel 135. This added support of waiting pages 133 may prevent pages from flopping over door 132, and may provide support for the pages so that the weight of the pages is directed downwards towards a bottom of bay 130.

In some embodiments sensor 145 may detect that a page 133 is present in bay 130, and may signal device 100 or a controller of device 100 such as controller 76 to initiate or proceed with a feeding of page 133 into for example channel 135. Sensor 147 may likewise detect that a page 133 has been inserted into tray 128, and may signal for example roller 131 to direct the page 133 to sensor 120. Sensor 144 may detect that a page coming from bay 130 has reached roller 131. In some embodiments, sensor 149 may detect that a page has completed its pass through device 100 or made sufficient progress in its pass through device 100 to allow another page 133 to be fed into the device. In some embodiments, when sensor 147 or sensor 144 detect that no page is present, a controller may, without input from sensor 149, calculate the additional distance required to complete the feeding, and may for example terminate an action of rollers 143, 142 and 131 unless other pages have been detected by for example sensors 145 or 147, in such embodiment there may be no need for sensor 149 to detect an end of page scanning. In some embodiments, once sensor 145 detects that no further pages are present in bay 130, a signal may be given that the document is complete, and that no further feeding of pages 133 is to be undertaken until a signal is given by a user or by the sensor. In some embodiments, if the first page has been scanned and within a given interval of for example, a few seconds, a new page does not activate sensors 147 or 144 or 145, a controller may assume that there are no more pages to feed and the scanning operation may be completed.

In some embodiments, once a page has passed by sensor 120, its ejection from housing 102 may be facilitated by one or more ejection rollers 143 and 142.

In some embodiments, sensors 144, 145, 147 and 149 may detect the presence of a page 133 and initiate a feed or an action of a roller in response to such present page. Similarly, one or more sensors may detect the absence of a proximate page and may terminate or initiate the rotation of a roller. For example, when sensor 145 detects the presence of a page and sensor 144 detects no page, this combination will trigger an activation of rollers 134 and possible 136 to feed a page from bay 130. When such fed page reaches sensor 144, a signal may trigger a starting of sensor 120 and rollers 131 and 143, and may stop the automatic feeder rollers 134 and 136. This process may be implemented with some delays so the newly fed page will go beyond sensor 144 and into a proper position between the scanner roller 131 and the sensor 120. Roller 134 may also roll until its idle state so that it is in a correct position for a next feed. In some cases device 100 or certain rollers will not stop rolling during the scanning of a page. For example, roller 136 may continue rolling even after roller 134 stops rolling. If sensor 144 and sensor 145 both detect no page, it may mean there are no more pages in bay 130 to be scanned and the document may be complete. If sensor 144 detects no page, but sensor 145 detects a page, it indicates that there is another page in bay 130 to be scanned, and the system may start feeding a new page as described above.

In some embodiments a scan of one page may be slower than another page if the processor, memory or communication lines receiving the scanned data are processing or transmitting other tasks. Sensor such as sensor 147 and 149 may gauge a relative speed of the scanning of a page through scanner 120, or the distance between the first page and a second page and may dynamically determine that such speed or distance will make scanner 120 ready to accept a second page sooner. Controller 76 or some other controller may in such or other cases initiate roller 134 to feed in a next page relatively quickly so that such next page is positioned at an entry point to scanner 120 once the scanning of prior page is finished. Other predefined intervals or conditions may be used for determining when a feeding of a second page is to begin a after a first page. For example, a feed of a second page may begin once the presence of the second page in channel 135 will not interfere with the first page that is progressing through device 100.

In some embodiments the entire casing that includes keyboard 112, sensor 120, the various rollers 134, 131, 136, 142, 143 and 140, as well as bay 130 and tray 128 and sensors such as sensors 144, 145, 147 and 149 may be included in housing 102.

Housing 102 may be formed of for example one or more sections of plastic, resin or other materials that may typically be used for fabrication of computer peripherals. Other materials may be used. Housing 102 may integrate some or all of keyboard 112, scanner sensor 120 and device 100 may or may not have a USB hub or some other communication hub. Housing 102 may be constructed of for example panels, plates or other pieces that may be screwed, snapped or otherwise connected together. Additions or expansions to housing 102 are possible such as for example through the addition of a multipage feeding component to housing 102, As added, the multipage feeding components may be considered part of the housing 102. Such hub may connect some or all of the components of device 100 to a computer or CPU through a communication cable and may provide some or all the components with power drawn over the cable from the computer or from an external power adapter. Some or all of such components may communicate with each other or act as completely separate devices. For example, device 100 or the multipage feeder may have its own power supply or it may draw its power from the scanner power supply or from USB hub. The multipage feeder system may have its own motor to power rollers 134 and 136, or it may rely on the motor of roller 131. The multipage feeder may have its own controller, or it may rely on a controller of scanner 120 for processing sensors inputs signaling operation of various rollers 134, 136 and others.

In some embodiments, either or both of upper tray 128 or bay 130 and channel 135 mechanisms may be supported by separate state machine logic or controllers, though it may also be possible to support the actions of one or both mechanisms from the CPU 70, CPU 18 or other processors in a separate computer. In some embodiments, one or more of sensors 144, 145, 147 or 149 may initiate scanning, though other initiation processes and control sensors are possible.

In some embodiments, communication between sensor 120 and processor 70 or memory 114 may be facilitated through the connections that may typically transmit key pad signals between a keyboard 112 and a computer. In some embodiments a wireless connection may be used.

Figure 3B:
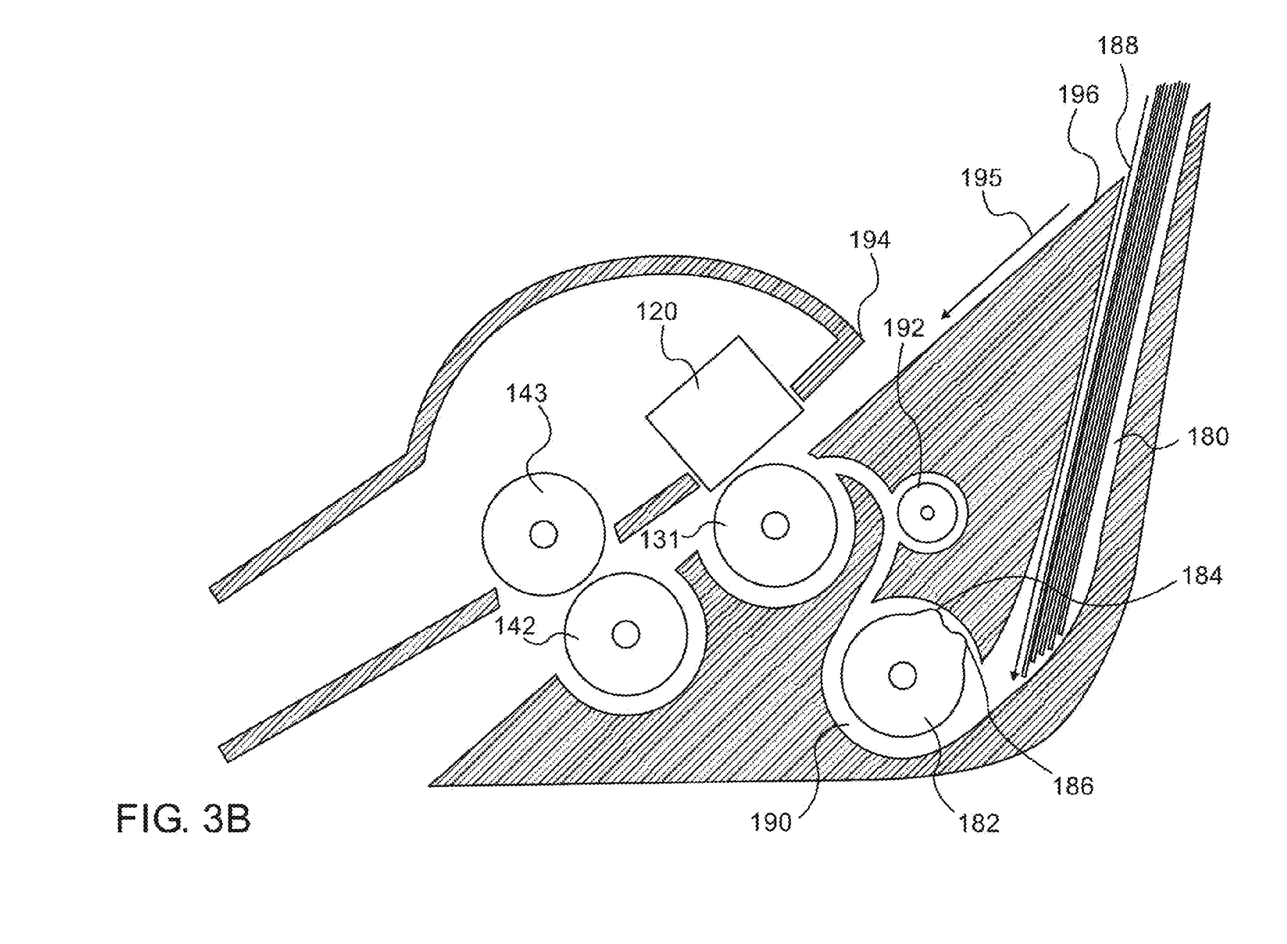
FIG. 3B is a schematic side-view diagram of an integrated keyboard scanner having multipage automated feeding capabilities and a single page feeding capabilities configured as top-page-first feeder in accordance with an embodiment of the invention.

The device 100 in FIG. 3A may function as a bottom-page-first feeder, in that roller 134 may feed the bottom page of pages 133 that are held in bay 130. In FIG. 3B, a position of roller 134 relative to bay 130 and channel 135 is shown as altered from that shown in FIG. 3A so that device 100 may function as a top-page-first feeder, in an embodiment of the invention. In FIG. 3B, bay 180 may be situated to the right of roller 182 so that protrusions 184 and 186 rotate clockwise to grab a top page 188 to propel such top page clockwise around channel 190 to roller 192 and on to roller 131 and scanner 120. Ejection of the page 188 by way of rollers 143 and 142 may be similar to the process described in FIG. 3A. The system and device described in FIG. 3B may also include a single-feed tray 196 and a single feed channel 194 that may accept a single page 195 or one page at a time.

In some embodiments, the automatic feeder mechanism may be the upper tray while optional single page mechanism will be positioned on a lower tray.

Returning to FIG. 3A, in some embodiments, one of the upper tray 128 and bay 130 may accept page sizes that are other than A4 or 8×11 standard sizes and may have an adjustable feed for items such as envelopes, business cards, invoices or receipts.

In some embodiments, a presence of a second page 133 to be scanned in bay 130 or in channel 135 upon the completion of a first page to be scanner, may signal a processor, such as processor 70 to associate a scanned image of the first page 133 to be scanned with the second page to be scanned such that the first and second pages 133 are associated as part of a single scanned document. In some embodiments, a user may be prompted to indicate whether or not the first page to be scanned and the second page to be scanned are to be associated as a single document. In some embodiments, upon detection of a presence in bay 130 or channel 135 of a second page to be scanned, processor 70 or some other processor, may prompt a user to indicate whether the scanning is to proceed as a multipage scan for all of the pages present in the stack of pages to be scanned. In some embodiments, the multipage feeder may respond to signals from a user that are input through the keyboard 112 or through a dedicated function key, as to whether to activate a feed of a sheet from the stack of pages 133 in bay 130. In this way a user may load several sheets into the feeder, scan and process a first scanned sheet, and then proceed, upon the user's signal, to scan and process a second scanned sheet or second document. The user may also direct the feeder to feed and process for example two or more of the stacked pages and then wait before feeding and scanning any remaining sheets. Other combinations of user commands to dictate a number of sheets to be fed, scanned and associated into a single document are possible, such that a user may place a stack of documents in the feeder, and proceed with scanning, viewing, associating and processing documents, while at desired points or intervals stopping a feed, and then restarting a feed with signals input from the keyboard 112.

Figure 3C:
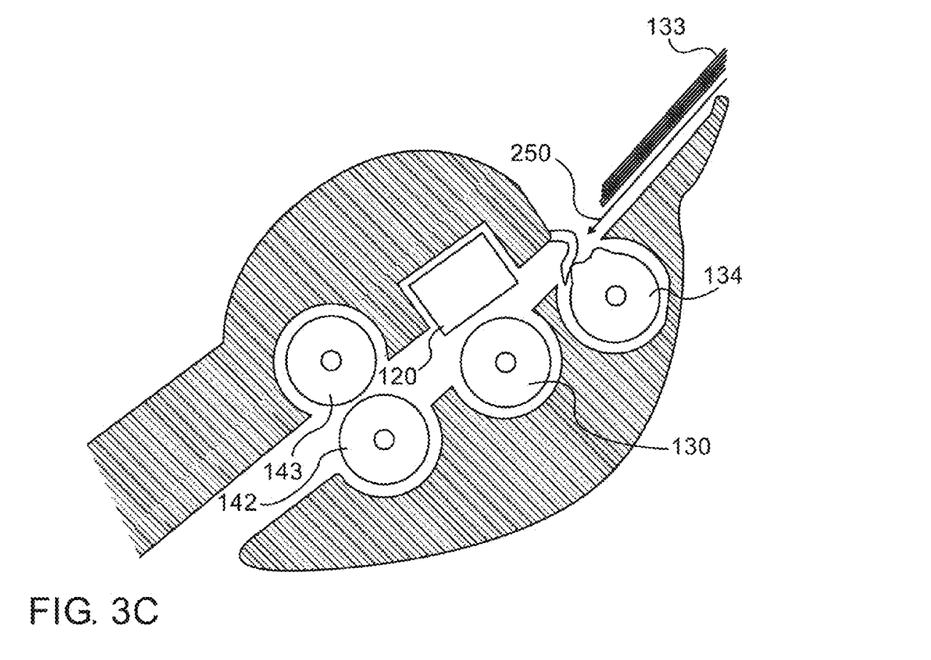
FIG. 3C is a schematic diagram of a keyboard scanner having one feeding channel for both single page feed and multipage feeds, and a separator roller suitable for bottom-page-first feeding, in accordance with an embodiment of the invention.
Figure 3D:
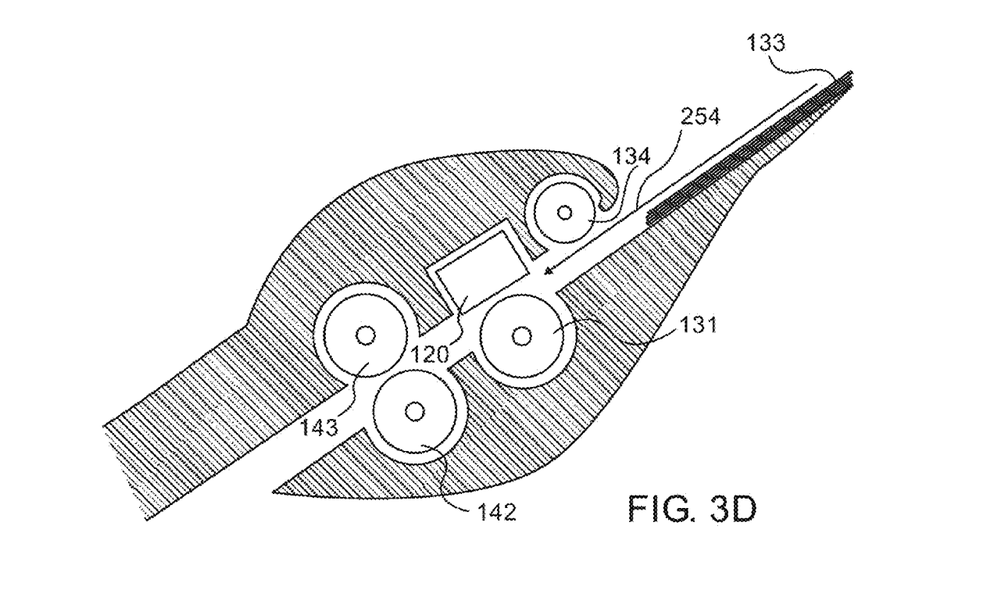
FIG. 3D is a schematic diagram of a keyboard scanner having one feeding channel for both single page feed and multipage feeds, and a separator roller suitable for top-page-first feeding, in accordance with an embodiment of the invention.

In some embodiments a single tray 128 may be used that may include a sensor to detect the insertion of a single page or of multiple pages, or that may continue a feeding and scanning process so long as further pages are detected in the tray 128. Referring to FIG. 3C, in some embodiments there may be a single mechanism or channel 250 that functions for both automatic feeding and single page feeding. In some embodiment the automatic feeder may include only a single roller such as roller 134 to feed a page 133 into the scanner 120. As appears in FIG. 3C, such mechanism may function as a bottom-page-first feeder in that roller 134 is situated to the left of pages 133. Alternatively, and as appears in FIG. 3D, a single tray mechanism that allows both multipage feed and single page feeding may be configured as a top-page-first feed mechanism, in that roller 134 is located to above the pages 133 to be fed into channel 254. In some embodiments, use of a single tray may limit the size, weight, height, complexity, cost, footprint or number of components that are included in the device 100. In some embodiments a height and volume of the device 100 may be constrained by the footprint size and height that may fit in front of a user and between the user and his computer screen. Is some embodiments, the far end of the device 100 may be of a height that fits underneath the bottom of a user's screen. Other heights and configurations are possible.

In some embodiments, the multipage feeding portion of device 100 may be completely detachable from a rest of device 100 or partially detachable by for example hinges connecting the two devices and a locking mechanism to fix them in working position. Such possible separation may allow better maintenance of the automatic feeding device, to save space or costs or for other reasons. For example, the multipage components may be defined to include bay 130, rollers 134, 136 and 140 as well as the other parts, sensors and components that operate with such rollers. The multipage feeding portion may be reattached as desired by a user. The multipage portion may be held to the rest of device 100 by clasps and may have plug-in ports for power and data transmission connections to rest of device 100, or may have a cable that may plug into ports on device 100.

Figure 5:
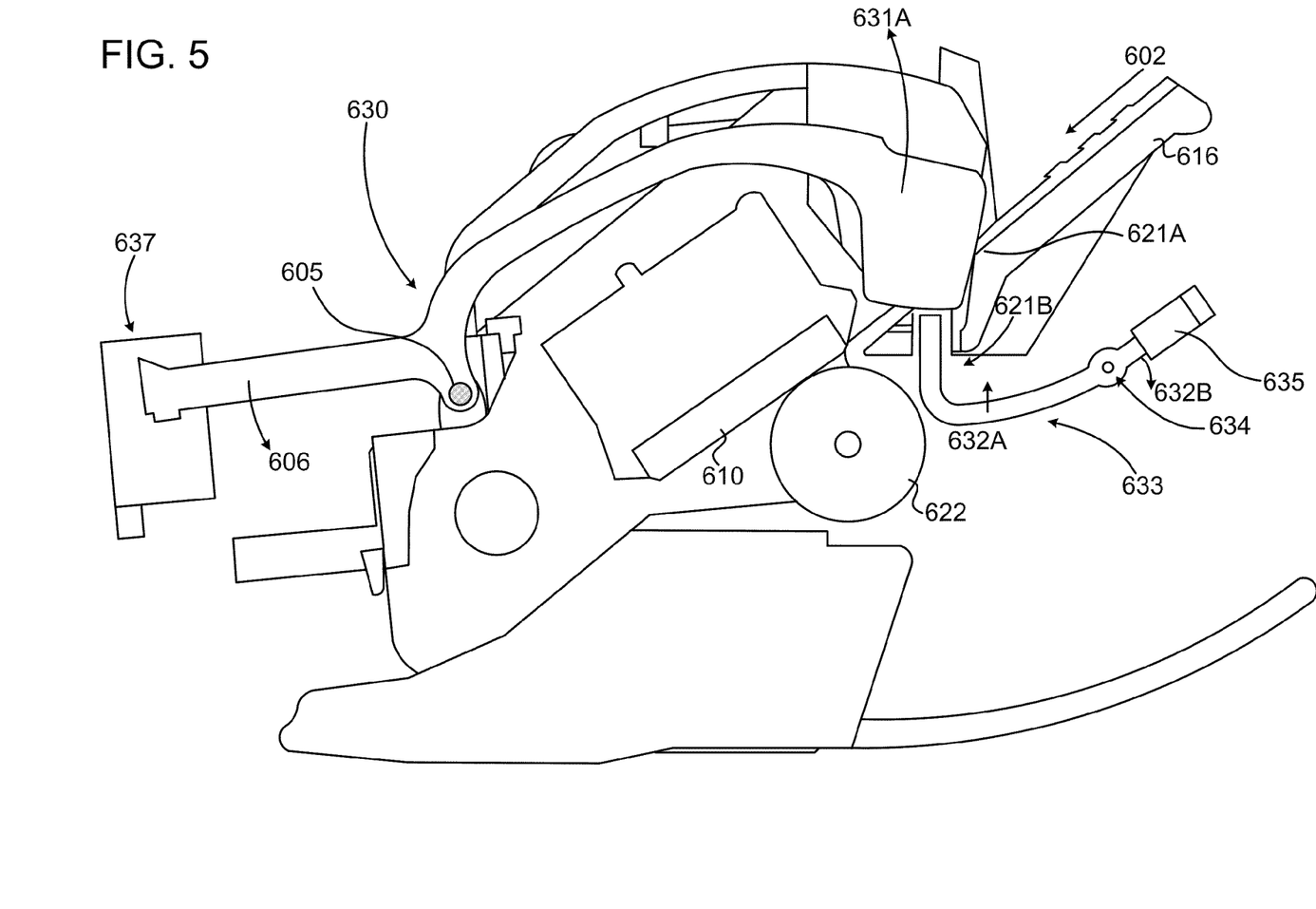
FIG. 5 is a diagram of a sensor mechanism for detecting a feed of a page into a sensor roller in accordance with an embodiment of the invention.

Reference is made to FIG. 5, a diagram of a sensor mechanism for detecting a feed of a page into a scanner roller in accordance with an embodiment of the invention. In some embodiments, a set of sensors may detect the presence of a page being fed into scanning sensor 610 from for example single page feeding slot 602 or from a direction of multipage feeding slot 633, such as from below slot base 616. A mechanical arm 630 may sense the paper feeding at either of such entry points or slots 602 or 633. One side of arm 630, such as the right side 631a is pushed up, or counterclockwise, when paper is fed from single slot base 616 into slot 602. When right side 631a is pushed up, arm 630 may pivot on its axis 605 so that a left side 606 of arm 630 pivots downward to activate sensor 637. Sensor 637 may send a signal to CPU 70 or controller 78 indicating the presence of a document approaching scanner 610 to be scanned.

An extension arm 632 may detect the presence of a page ready to be scanned that is approaching from a direction of multipage feeding slot 633 (such direction would be comparable to a position of guide 123 as appears in FIG. 3A). When a page moves from a direction of multipage feeding slot 633, it may push up a left side 632a of arm 632. As left side 632a of arm 632 rises, from point 621a to 621b, right side 632b of extension arm 632 may fall. Such motion of right side 632b may trigger sensor 635 that a page is being engaged by roller 622. As left side 632a rises, it may also raise a right side 631a of arm 631 which in turn causes left side of arm 631 to pivot downward, simulating the same process as feeding a page on the single feeding slot 602, as is described above, and signaling a controller 70 or controller 78 to start a scanning process. The feeding of a page into multipage feeding slot 633 may, through the action of extension arm 632 on arm 631, mimic a feeding of a page into single page slot 602. Such action may trigger sensor 637 that a page 133 has been fed into scanning position while triggering sensor 635 for the controller 76 that the page 133 has been successfully fed all the way to the scanner. In some embodiments, where the control of the automatic feeder 76 is not done separately but by the same control of the scanner 78, there will be no need for sensor 635 and only sensor 637 will be used. In some embodiments, instead of arms 630 and 632 and sensors 637 and 635, sensors such as transmit/receive sensors may be used, and the document passing in between such sensor/transmitter and receiver sensors may trigger the required signals for feed of a page.

Figure 6:
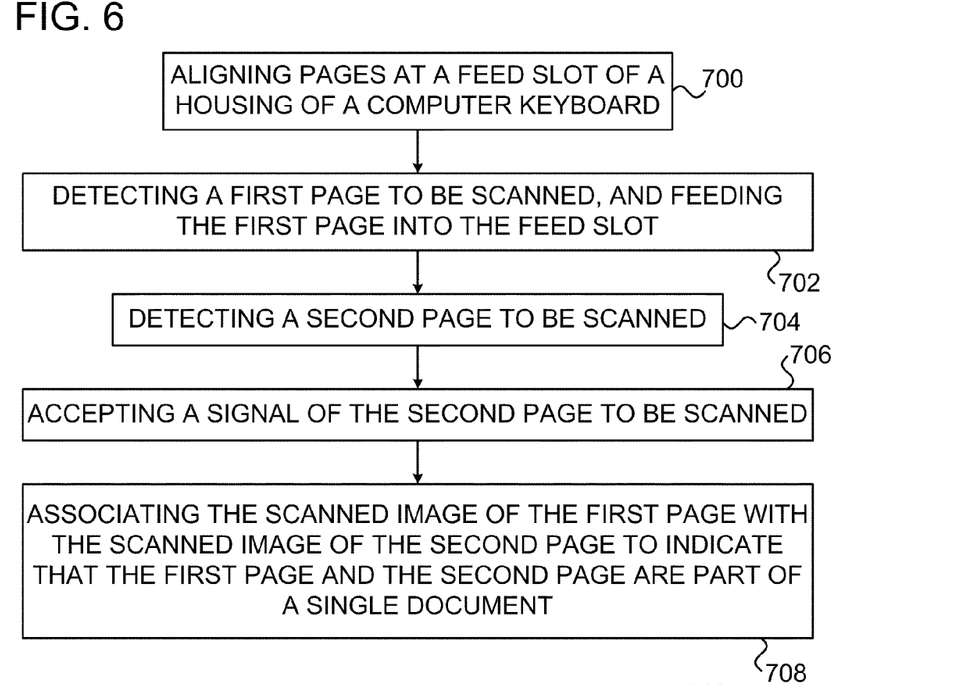
FIG. 6 is a flow diagram of a method in accordance with an embodiment of the invention.

Reference is made to FIG. 6, a flow diagram of a method in accordance with an embodiment of the invention. The method of FIG. 6, and the other flowcharts shown below, may be practiced by the devices described herein, or by other devices.

In block 700, a plurality of pages may be aligned at a feed slot located at a back of a housing of a computer keyboard. In block 702, a sensor in the housing or a signal from a user may detect a first page to be scanned, and may issue a signal for feeding of the first page into the feed slot. In block 704, the sensor may detect a presence in the feed slot of a second page to be scanned. In block 706, a processor may accept a signal that there has been detected a presence of the second page to be scanned. In block 708, a processor may associate a scanned image of the first page with a scanned image of the second page to indicate that the first page and the second page are part of a single scanning batch to be saved as one document.

Figure 7:
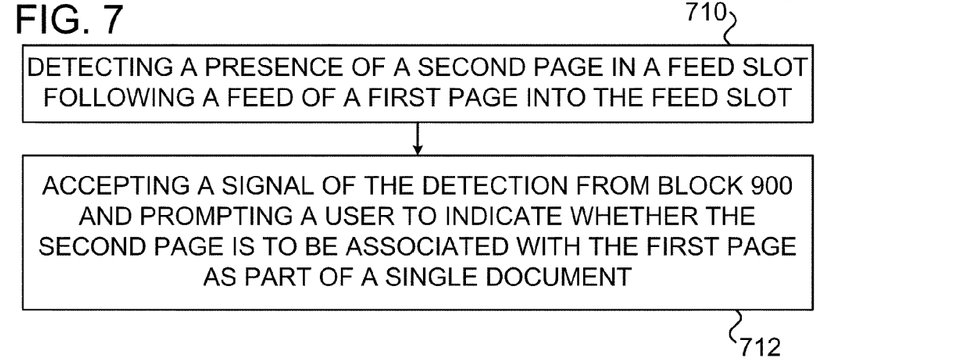
FIG. 7 is a flow diagram of a method in accordance with an embodiment of the invention.

Reference is made to FIG. 7, a flow diagram of a method in accordance with an embodiment of the invention. In block 710 a sensor may, following a feed of a first page into a feed slot, detect a presence of a second page in a feed slot. In block 712, a processor may accept a signal of such detection from block 714, and may prompt a user to indicate whether the second page is to be associated with the first page as part of a single document.

Figure 8:
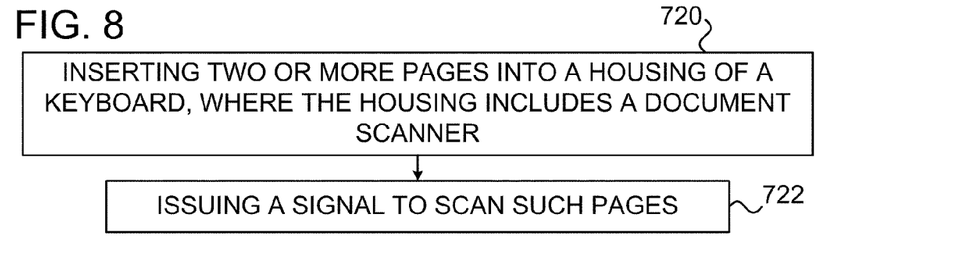
FIG. 8 is a flow diagram of a method in accordance with an embodiment of the invention.

Reference is made to FIG. 8, a flow diagram of a method in accordance with an embodiment of the invention. In block 720, several pages may be inserted into a bay of a housing of a keyboard, where the housing includes a scanner to scan pages. In block 722, a user may issue a signal from a key of the keyboard or from some other input device associated with the housing (such as a mouse or touch screen), where the signal is to initiate a scan of the pages that were inserted. In some embodiments, a processor may issue a signal to feed a first page, and then after a pre-defined interval, the processor may issue a signal to feed a second page. In some embodiments, a method may include drawing a page between a protrusion of a feeding wheel of the housing and a traction member of the housing.

In some embodiments, terminating a contact of the page with one of the protrusions may occur once the page reaches an entry point of at least one other wheel that will continue propelling the page along a channel towards the scanner.

Figure 9:
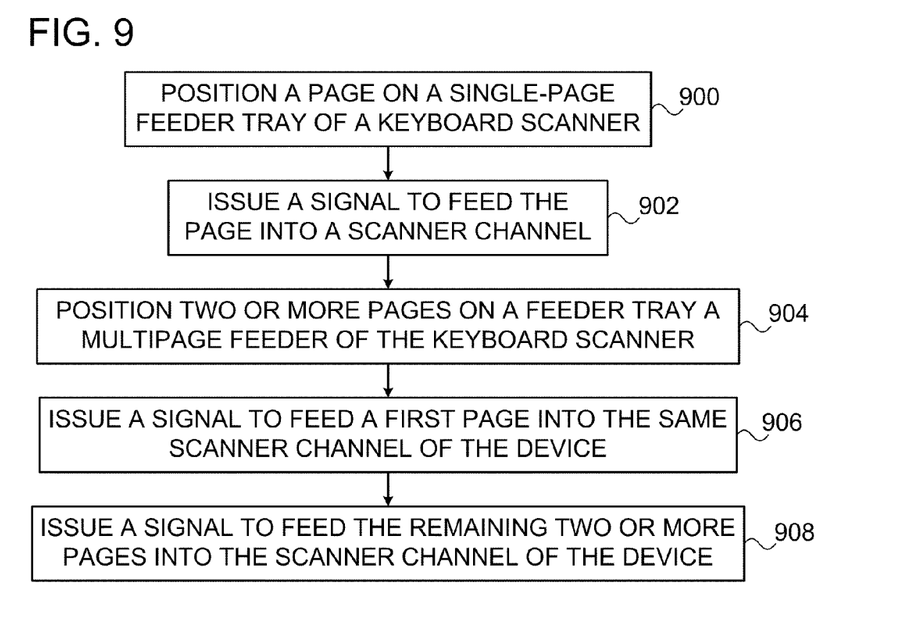
FIG. 9 is a flow diagram of a method of accepting a feed of a page from possible feeding channels, in accordance with an embodiment of the invention.

Reference is made to FIG. 9, a flow diagram of a method of accepting a feed of a page from either of two possible feeding channels, in accordance with an embodiment of the invention. In block 900, a single page may be positioned on a single-page feeder tray of an integrated keyboard scanner device. In block 902, a signal may be issued to feed such single page into a scanner channel of such device. In block 904, two or more pages may be positioned on a feeder tray or bay of a multipage feeder. In block 906, a signal may be issued to feed a first of such two or more pages into the scanner channel of the device, such channel being the same channel as that used by a feed from the single-page tray. In block 908, a signal may be issued to feed all or some of the remaining pages from the two or more pages, into the scanner channel of the device.

Figure 10:
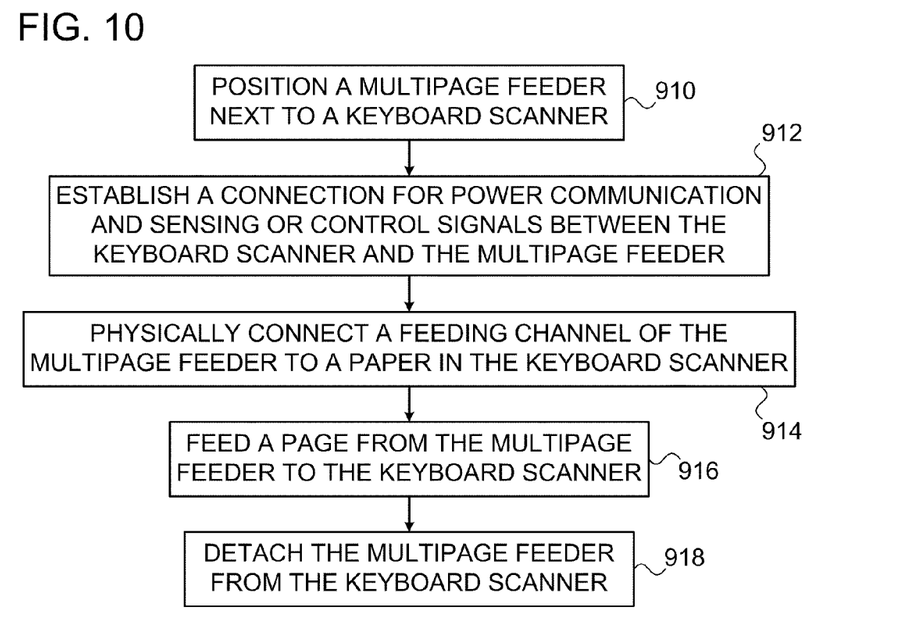
FIG. 10 is a flow diagram of a method of attaching and detaching a multipage feeder from a keyboard scanner device in accordance with an embodiment of the invention.

Reference is made to FIG. 10, a flow diagram of a method of attaching and detaching a multipage feeder from a keyboard scanner device in accordance with an embodiment of the invention. In block 910, a multipage feeder may be positioned next to a keyboard having a page scanning sensor. In block 912, a connection of one or more of power, communication and sensing or control signals may be established between the keyboard/scanner housing on the one hand, and the multipage feeder on the other hand. In block 914, a physical connection such as a clasp, lock, hook or other securing device may fix or align a feeding channel of the multipage feeder into a channel that is present in the keyboard scanner housing. In block 916, a page may be fed from the attached multipage feeder into the keyboard scanner housing, and such page may proceed to be scanned in the housing. On block 918, the multipage feeder may be detached from the keyboard scanner housing.

Figure 11:
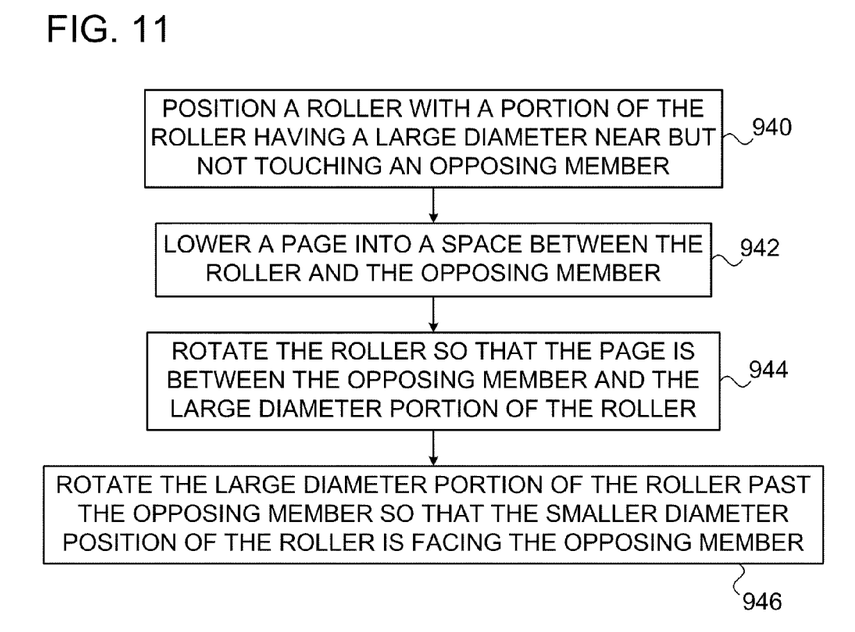
FIG. 11 is a flow diagram of a method of feeding a page into a channel having a roller with two more diameters, in accordance with an embodiment of the invention.

Reference is made to FIG. 11, a flow diagram of a method of feeding a page into a channel having a roller with two or more diameters, in accordance with an embodiment of the invention. In block 940, a roller may be set in a first position, where a first portion of the roller that has a larger diameter is near, but not touching an opposing member. In block 942, a page may lower into the space between the roller and the opposing member. In block 944, the roller may rotate so that the lowered page is caught between the opposing member and the large diameter portion of the roller. In block 946, the large diameter portion of the roller may rotate past the opposing member, so that the smaller diameter portion of the roller is facing the opposing member. At such point, the page may be freed from the pulling traction that was created between the opposing member and the large diameter portion of the roller.

Figure 12:
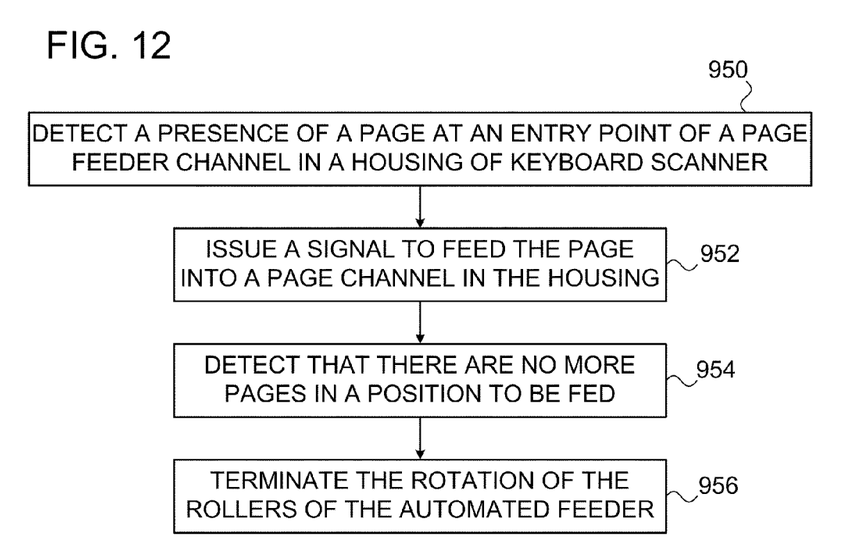
FIG. 12 is a flow diagram of feeding one or more pages that are brought into position near a page feeder of a keyboard/scanner housing, in accordance with an embodiment of the invention.

Reference is made to FIG. 12, a flow diagram of a method of feeding one or more pages that are brought into position near a page feeder of a keyboard scanner housing, in accordance with an embodiment of the invention. In block 950, a sensor may detect the presence of a page at an entry point of a page feeder channel. In block 952, a controller that may be attached to or associated with the sensor may issue a signal to feed the page into a page channel in the housing. Such signal may trigger the rotation of one or more rollers in the housing or aligned with the page feeding channel of the housing. In block 954, a sensor may detect that there are no more pages in a position to be fed into the keyboard scanner housing. In block 956, the controller may terminate the rotation of the rollers of the keyboard scanner. In some embodiments, the presence of a page in position on a feeder may be sufficient to initiate the feeding of the page into a channel, even without input from a user.

It will be appreciated by persons skilled in the art that embodiments of the invention are not limited by what has been particularly shown and described hereinabove. Rather the scope of at least one embodiment of the invention is defined by the claims below.

I claim:

1. A device comprising:
   a computer keyboard housing,
   said housing including a computer keyboard,
   a document scanner; and
   a multipage feeder;
   wherein said housing has a height dimension of 1 to 4 inches.

2. The device as in claim 1, wherein said housing includes a single page feeder.

3. The device as in claim 1, wherein said housing includes a first page channel for directing a single page into said scanner, and a multipage channel for directing a page of said plurality of pages into said scanner.

4. The device as in claim 1, comprising a sensor to detect a presence of a second of said plurality of pages, and to issue a signal, upon a detection of said presence of said second page, to feed said second page into said document scanner upon a progress of a scanning of said first of said plurality of pages.

5. The device as in claim 1, wherein said housing includes a page separator suitable for feeding a first page of said plurality of pages to said document scanner, and for feeding a second page of said plurality of pages to said document scanner upon the satisfaction of a condition following said feeding of said first page.

6. The device as in claim 1, wherein a footprint of said housing approximates a footprint of a computer keyboard.

7. The device as in claim 1, wherein said multipage feeder is detachably connected to said housing.

8. The device as in claim 1, wherein said scanner is detachably connected to said multipage feeder and detachably connected to said housing.

9. The device as in claim 1, comprising an extendable arm, suitable to support a portion of said plurality of pages distal to said document scanner.

10. The device as in claim 1, comprising an off-center roller, said off center roller having a first diameter at a first point on a circumference of said off-center roller, and a second diameter at a second point on said circumference of said off-center roller.

11. The device as in claim 1, wherein said consecutive feeding is performed without an input of a user and is triggered by a signal from a sensor that a page is in a feeding position in said housing.

12. A method of scanning a plurality of pages, comprising:
    inserting a plurality of pages into a housing of a keyboard, said housing including a scanner to perform said scanning;
    issuing a signal to initiate a feed of said page to said scanner from a sensor that detects a page of said plurality of pages;
    wherein said housing has a height dimension of 1 to 4 inches.

13. The method as in claim 12, comprising issuing a signal to feed to said scanner a first of said plurality of pages, and issuing a second signal to feed to said scanner a second of said plurality of pages.

14. The method as in claim 12, comprising drawing a page of said plurality of pages between a protrusion of a feeding roller in said housing and a traction member in said housing.

15. The method as in claim 14, comprising terminating a contact of said page by at least of one said protrusions and said member upon an entry of said page of said plurality of pages into a second roller.

* * * * *